(12) United States Patent  (10) Patent No.: US 6,311,017 B1
Mori  (45) Date of Patent: *Oct. 30, 2001

(54) WATERPROOF HOUSING FOR A DEVICE ADAPTED TO RECEIVE A REMOVABLE SUB-ASSEMBLY

(75) Inventor: Ryuichi Mori, Yokohama (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,514

(22) Filed: Mar. 11, 1998

(30) Foreign Application Priority Data

Mar. 11, 1997 (JP) .................................................. 9-072829

(51) Int. Cl.⁷ .............................. G03B 17/08; H04N 7/18
(52) U.S. Cl. ................................ 396/27; 396/25; 396/29; 348/81
(58) Field of Search .............................. 396/25, 27, 29, 396/26, 28; 348/81; 206/316.1, 811

(56) References Cited

U.S. PATENT DOCUMENTS

| | | | |
|---|---|---|---|
| 3,412,661 | * | 11/1968 | Soumar .................................. 396/25 |
| 4,281,343 | * | 7/1981 | Monteiro ................................ 396/25 |
| 4,994,829 | * | 2/1991 | Tsukamoto .............................. 396/25 |
| 5,107,286 | * | 4/1992 | Sergeant et al. ........................ 396/25 |
| 5,285,894 | * | 2/1994 | Kamata et al. ..................... 206/316.1 |
| 5,294,988 | * | 3/1994 | Wakabayashi et al. ............. 396/27 X |
| 5,305,032 | * | 4/1994 | Arai ........................................ 396/25 |
| 5,655,172 | * | 8/1997 | Omi et al. ............................. 396/538 |
| 5,669,019 | * | 9/1997 | Woltz et al. ............................ 396/25 |
| 5,758,200 | * | 5/1998 | Inoue et al. ............................ 396/25 |

* cited by examiner

Primary Examiner—Alan A. Mathews
(74) Attorney, Agent, or Firm—Erik B. Cherdak & Associates, LLC

(57) ABSTRACT

A waterproof housing for housing a device that is adapted to receive a sub-assembly. The waterproof housing includes a body having a wall. The wall includes an aperture. The aperture has dimensions corresponding to the sub-assembly. The aperture provides operative access to the device to allow it to receive the sub-assembly through the aperture. The waterproof housing is suitable for housing devices that may have compartments or portions which are to receive corresponding sub-assemblies. Such devices include, but are not limited to, film-based cameras that utilize film cartridges, digital imaging cameras that utilize replaceable data storage modules (RAM cards, magnetic media such as diskettes, etc.), video cameras that utilize magnetic tape cassettes, and devices that utilize batteries maintained in battery compartments.

22 Claims, 6 Drawing Sheets

WATERPROOF HOUSING FOR A DEVICE ADAPTED TO RECEIVE A REMOVABLE SUB-ASSEMBLY

BACKGROUND OF THE INVENTION

1. Field of the Invention

The present invention relates to waterproof housings for cameras and other devices that utilize sub-assemblies such as film cartridges and batteries.

2. Description of the Art

Waterproof housings for cameras and other portable devices are well known. More particularly, waterproof housings for devices that utilize replaceable or mountable sub-assemblies are also well known. For example, waterproof housings have been used with cameras that utilize replaceable film cartridges.

Unfortunately, such waterproof housings do not allow sub-assemblies such as film cartridges to be easily inserted into and removed from main assemblies such as cameras without totally removing the main assembly from such waterproof housings. In large part, the inability to remove a sub-assembly from a main assembly without removing the main assembly from a waterproof housing is due to the design of many main and sub-assemblies. For example, in the case of a camera (e.g., a 35 mm camera), a film cartridge sub-assembly is often loaded into the camera body by opening a back cover thereof to reveal an inner compartment and to enable manual operations to properly mount and load a film strip. Since opening a back cover of a camera typically involves a range of motion that is large relative to a camera body (e.g., a range of motion associated with a hinged camera back), waterproof housings have been designed so that loading and unloading of a film cartridge sub-assembly is to be done by removing a corresponding camera assembly.

Unfortunately, as cameras and other main assemblies have changed and improved, waterproof housings have not realized corresponding improvement. For example, new cameras have been designed to accept new film cartridge sub-assemblies. In particular, cameras that utilize Advanced Photo System (APS) type films and film cartridge sub-assemblies have been mass-marketed for their "drop-in" loading characteristics. In the case of APS cameras, a relatively small film compartment door typically opens at a back side or at the bottom of a camera body to reveal a relatively small film cartridge compartment. There is no need to open an entire back side of a camera body to allow for manual operations to load a film strip. With APS cameras, film loading is automated. Additionally, because the film compartment of an APS camera is relatively small, the risk of dust and dirt entering a camera body when changing film is lower than with typical 35 mm cameras and the like. Additionally, because film strip loading is automated, the risks associated with fingers coming into contact with internal mechanisms of a camera are also mitigated, Accordingly, because assemblies like modem cameras (e.g., APS cameras, digital cameras that incorporate removable storage mediums and power supplies) do not require large sections of their bodies to be opened to insert and remove sub-assemblies like film cartridges, etc., current waterproof housings that require whole assembly removal for sub-assembly insertion and removal are not well suited to protect such assemblies from environmental conditions. An example of such an arrangement is illustrated in a drawing figure (FIG. 1) which is attached to this patent document.

FIG. 1 illustrates a side cross section view of a waterproof housing that houses an APS-type camera. In particular, a main camera assembly (camera) 101 is housed in a waterproof housing 41. Camera 101 includes a lens unit 104 and has a film cartridge sub-assembly 103 mounted therein. A film compartment 102a includes door 102 which is shown in a closed state. Waterproof housing 41 includes a body 40, a window 44 (glass, acrylic, plastic, etc.), and a back 42. Back 42 is mounted on body 40 in a conventional way (e.g., screws, etc.). Water and other material are kept out of body 41 as a result of seals 43 and 45 which surround back 42 and window 44 conventional fashion, respectively. For purposes of clarity, photographic operations are carried out with the arrangement shown in FIG. 1, by allowing light to enter waterproof housing 41 (in the direction identified as "p") and to be captured and transmitted via lens unit 104 to a film substrate in camera 101.

To remove film cartridge 103 from camera 101, camera 101 must be completely removed from waterproof housing 41 since door 102 is accessible at the bottom of camera 101. Such operation is required in order to gain access to film compartment 102a via cover 102. Accordingly, each time waterproof housing 41 is opened there is a risk of allowing water and other materials to enter. For example, if film cartridge 103 is to be removed or replaced while on a beach, sand may be caused to enter waterproof housing 41 and to possibly negatively affect the seal that may be made by seals 43. If a watertight seal cannot be made between back 42 and body 40, water and other material ultimately may enter waterproof housing 41 and interfere with or damage camera 101.

Thus, there exists a need to provide a waterproof housing for a camera assembly which does not require the camera assembly to be removed for sub-assembly (e.g., film cartridge, etc.) insertion and removal.

SUMMARY OF THE INVENTION

In view of the preceding comments, it is a principal object of the present invention to solve the aforementioned problems associated with prior art waterproof housings.

It is another object of the present invention to provide a waterproof housing that has a body having an aperture that allows operative access to a housed device without requiring the housed device to be removed from the waterproof housing.

It is another object of the present invention to provide a waterproof housing that has a body having an aperture that allows a housed device to receive a sub-assembly through the aperture.

It is another object of the present invention to provide a waterproof housing that mitigates risks associated with water and other material entering the housing even during times when a housed device such as a camera is to receive a sub-assembly such as a film cartridge.

The present invention achieves the aforementioned objects and delivers certain benefits not heretofore realized in the waterproof housing arts. For example, a device housed within a waterproof housing according to the present invention need not be removed from such housing even during times when a sub-assembly like a film cartridge for a camera is to be replaced or loaded into the housed device. Moreover, because a waterproof housing according to the present invention has an aperture that provides operative access to a portion of a device that is adapted to receive a sub-assembly, only a relatively small portion of the waterproof housing will be open to an environment when the device is to receive the sub-assembly. there is less of a risk of water and/or other material entering the interior of the waterproof housing.

The present invention achieves the aforementioned objects and delivers the above-stated benefits by providing a waterproof housing for housing a camera having film cartridge compartment and a film cartridge compartment cover. The waterproof housing includes a body having a wall. The wall has an aperture that provides operative access to the film cartridge compartment of the camera.

According to another aspect of the present invention, provided is a waterproof housing for housing an imaging device that is configured to receive a sub-assembly related to the operation of the imaging device. The waterproof housing includes a body having a wall. The wall has an aperture that provides operative access to a portion of the imaging device that is configured to receive the sub-assembly which is related to the operation of the imaging device.

According to a final aspect of the present invention, provided is a waterproof housing for housing a device that is adapted to receive a sub-assembly. The waterproof housing includes a wall. The wall has an aperture that has dimensions that correspond to the dimensions of the sub-assembly. The aperture provides operative access to the device to allow the device to receive the sub-assembly through the aperture.

BRIEF DESCRIPTION OF THE DRAWING FIGURES

The present invention is described below with reference to the following drawing figures, of which:

FIG. 4b is a cross section view of the aperture unit illustrated in FIG. 4a;

FIG. 4c is a back surface view of the cover used to cover the aperture unit illustrated in FIG. 4a;

DETAILED DESCRIPTION OF THE PREFERRED EMBODIMENTS

Figure 1:
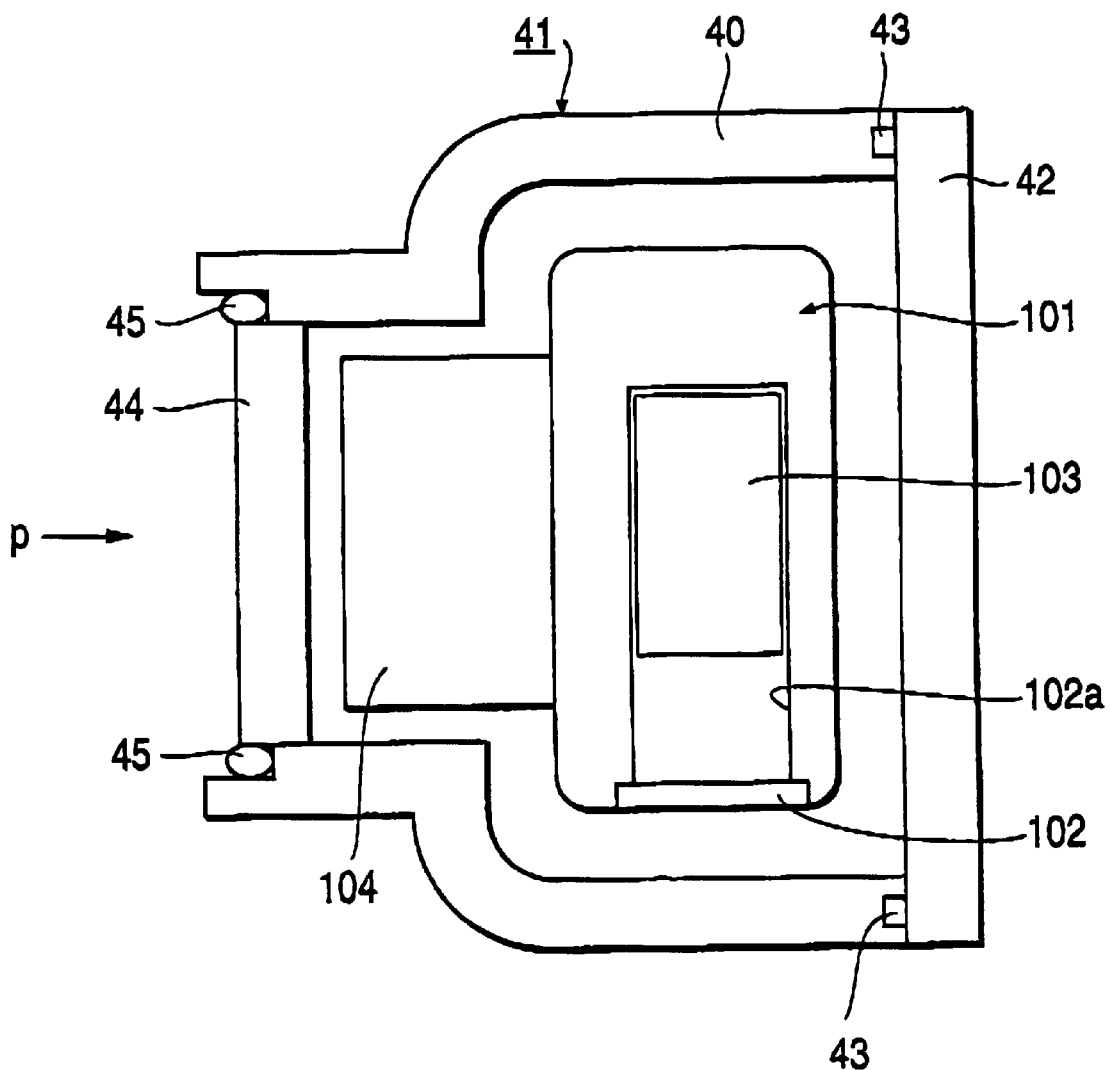
FIG. 1 is a cross section diagram of a waterproof housing according to the prior art.

The present invention is now discussed with referenced to the drawing figures that were briefly described above. Unless otherwise specified, like parts are referred to with like reference numerals. A description of the structure of each preferred embodiment is followed by a discussion of its corresponding operation.

In this section, preferred embodiments of a waterproof housing are described. More particularly, such embodiments illustrate waterproof housings that encase and house cameras. It should be understood, however, that housing an imaging device such as a camera is merely an exemplary use of a waterproof housing according to the present invention. The present invention is capable of encasing and housing a wide range of assemblies and devices including, but not limited to, imaging devices like cameras, digital cameras, video cameras, etc., portable electronic devices which have compartments for and/or utilize removable and/or replaceable sub-assemblies such as a film cartridges, memory cards (e.g., RAM cards), video tape cassettes and other magnetic media (e.g., diskettes), batteries, etc.

It should also be noted that the housings illustrated and described herein are waterproof housings which may be used to protect devices housed therein from coming into contact with water and/or other materials within a particular environment. There is no requirement, however, that the "waterproof housings" of the present invention be used in water to realize the benefits provided by the same. To the contrary, the waterproof housings of the present invention may simply be used to protect a device such as a camera from coming into contact with materials in a particular environment (e.g., dust, sand, debris, etc.).

Figure 2:
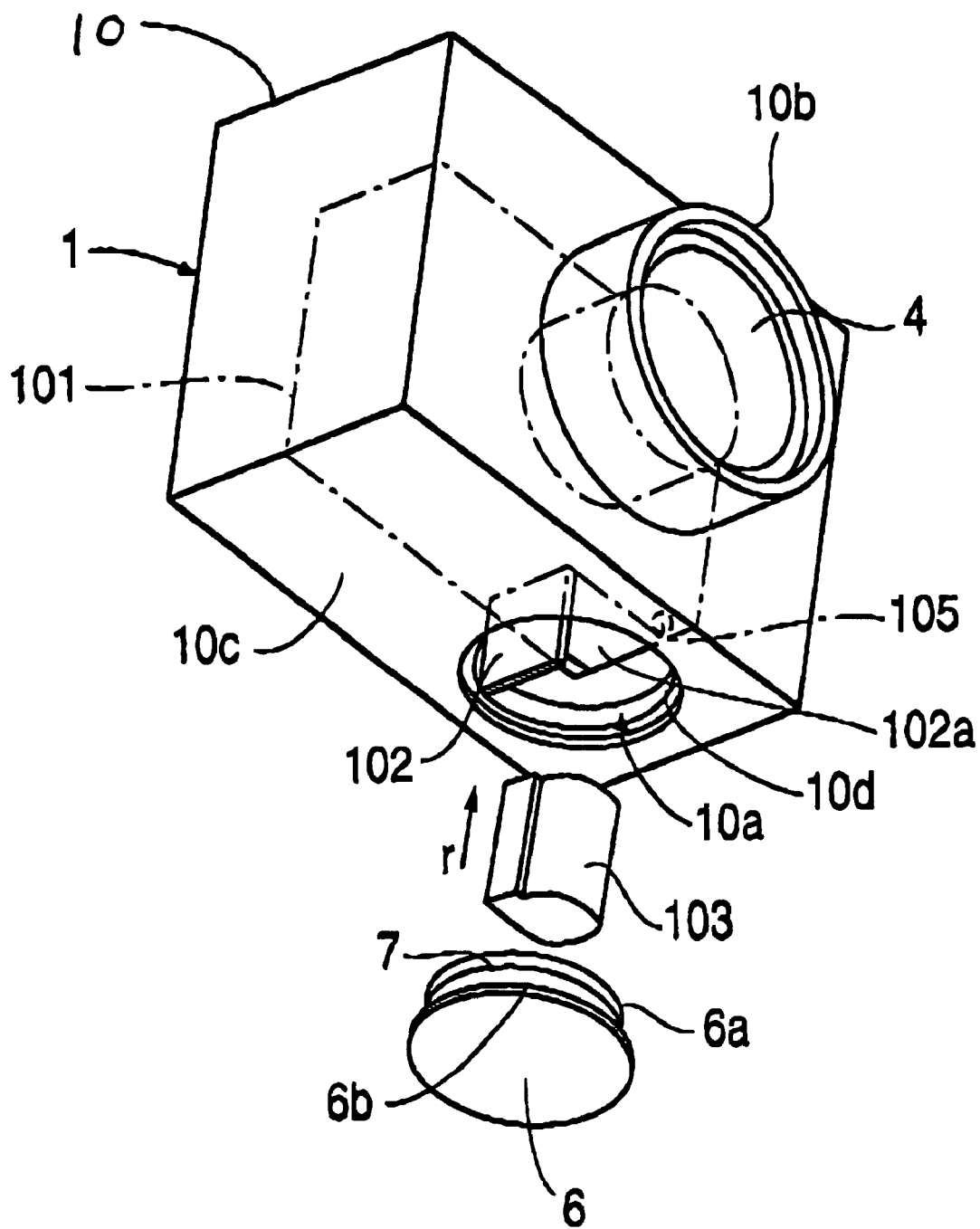
FIG. 2 is an oblique diagram of a waterproof housing for housing a device such as a camera according to a preferred embodiment of the present invention.

Referring now to FIG. 2, depicted therein is an oblique diagram of a waterproof housing for housing a device such as a portable camera according to a preferred embodiment of the present invention. In particular, waterproof housing 1 includes a body 10, a back 2 (FIG. 3), and a projection 10b Body 10 has a box-like shape which is configured to removably receive a camera 101 (shown in phantom lines). Projection 10b is adapted to receive a lens unit 104 of camera 101. A transparent window 4 made from glass, acrylic, plastic, etc. is maintained in projection 10b so as to allow imaging light to enter body 10 and to transmitted to a film or imaging surface maintained within camera 101.

Figure 3:
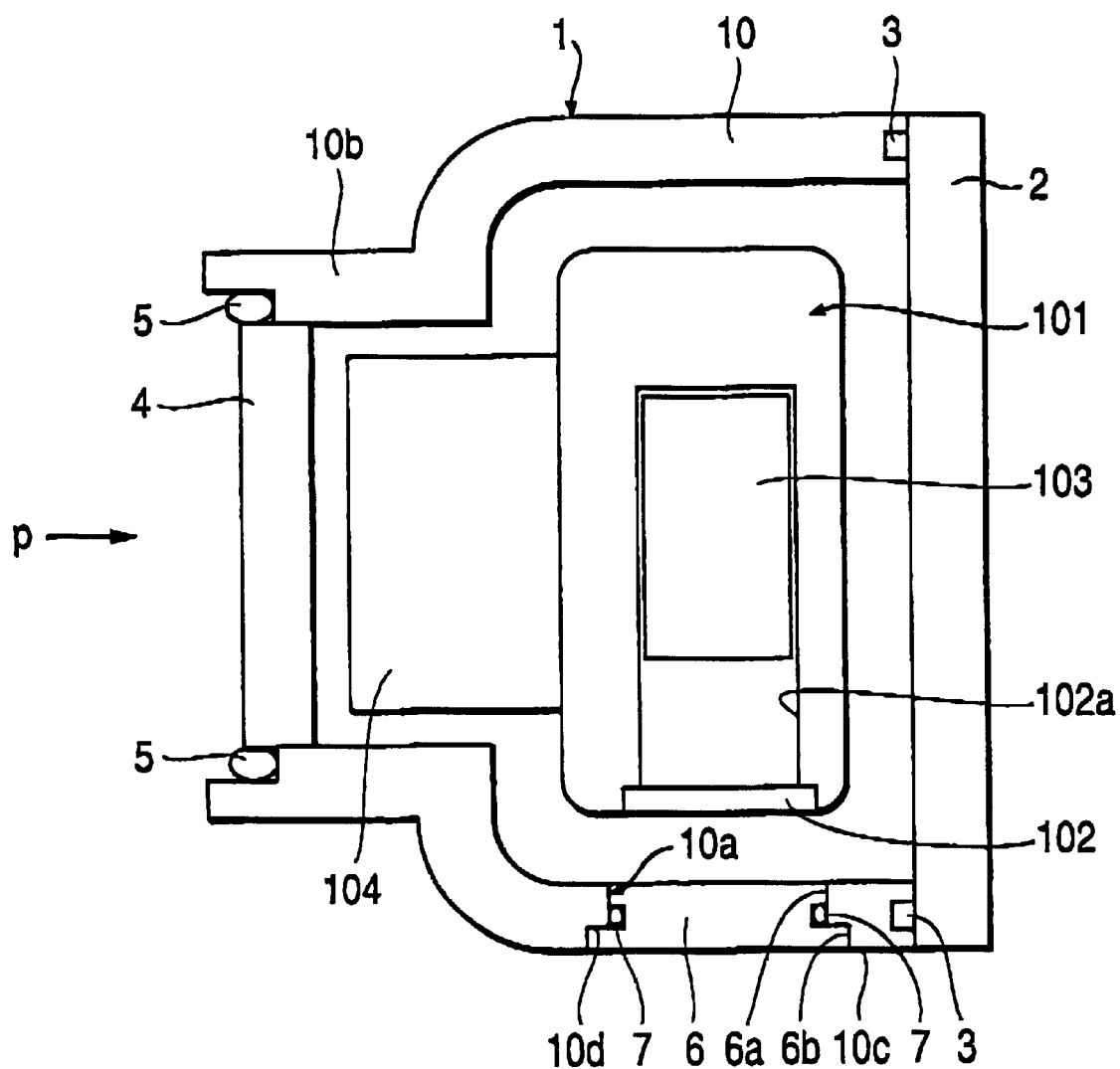
FIG. 3 is a side cross section diagram of the waterproof housing illustrated in FIG. 2.

The structure illustrated in FIG. 2, is further described below with regard to FIG. 3. In particular, FIG. 3 depicts a side cross section diagram of the waterproof housing illustrated in FIG. 2. More particularly, body 10 of waterproof housing 1 further includes a waterproof seal member 3 disposed in an edge surface of body 10. Waterproof seal 3 is intended to maintain a watertight seal between body 10 and back 2. Body 10 and back 2 may be coupled together by well-known hinges and the like (not shown).

A waterproof seal member 5 is located between the inner face side of an end portion of projection 10b and an external peripheral end surface of window 4. Window 4 will allow imaging light to pass to camera 101 In the direction identified by the arrow labeled "p." Waterproof seal member 5 maintains a watertight seal within housing 1. Furthermore, waterproof housing includes well-known waterproof structures to allow for operation of shutter buttons, etc.—such structures are not shown in the drawing Camera 101 is an APS type camera that utilizes APS film cartridge sub-assemblies. Accordingly, a film cartridge 103 may be inserted into and taken out of camera 101 and, in particular, into and out of compartment 102a, after opening cover 102. It will be readily apparent and understood how film cartridge 103 is placed into compartment 102a through movement in the direction identified by the arrow labeled "r" (FIG. 2). Cover 102 is disposed at a bottom surface of camera 101 and is opened by a door actuator member (finger slide button) 105 (shown in phantom lines in FIG. 2) which will be immediately understood by those skilled in the art. Waterproof housing 1 also includes an aperture 10a which is formed and maintained in a wall of waterproof housing 1 (e.g., a bottom surface wall). Aperture 10a will allow a sub-assembly like film cartridge 103 to be inserted into and taken out of camera 101 and, in particular, into and out of compartment 102a without removing camera 101 from waterproof housing 1.

Aperture 10a is configured to be closed by a cover 6. Cover 6 is removably mounted on waterproof housing 1. Cover 6 may simply be configured to act as a plug member that is to be mounted within aperture 10a. Alternatively, cover 6 may be configured as a round plug member that may be threaded and fitted into a corresponding receiving thread formed within waterproof housing 1. Cover 6 includes a waterproof seal member 7, and has a large portion 6b (a cap member) and a smaller portion 6a adapted to be inserted into aperture 10a.

When cover 6 is seated in aperture 10a of waterproof housing 1, large circularly shaped portion 6b (e.g., a cap member) is caused to come into contact with shelf member 10d formed in body 10 of waterproof housing 1 Accordingly, after cover 6 is screwed into or otherwise mounted within aperture 10a, large circularly shaped portion 6b will come to stop at shelf member 10d. As cover 6 is fastened within aperture 10a, waterproof seal member 7 will act to prevent water and other materials from entering the interior compartment of waterproof housing 1.

It is important to note that aperture 10a is large enough to allow cover 102 of camera 101 to be operated to allow film cartridge 103 (i.e., a sub-assembly) to be inserted into and removed from compartment 102a within camera 101. Accordingly, aperture 10a should have dimensions that are needed to have camera 101 accept or otherwise receive a sub-assembly like film cartridge 103. In other words, if operative access to a film cartridge compartment is desired, aperture 10a should have dimensions that are no larger than necessary to allow operative access to the film cartridge compartment, a door member thereof, and some form of manual door operation mechanism and the like (if provided). Accordingly, while the back panel of the waterproof housing of the prior art arrangement shown in FIG. 1 (discussed above) would permit operative access to a rear accessible film cartridge compartment, such a back panel would not be considered an aperture in the context of the present invention since there is no aperture or hole formed in such back panel through which a sub-assembly may pass and since the size of the back panel would be overly large in relation to the dimensions of a rear accessible film cartridge compartment.

Moreover, it is important to note that when waterproof housing 1 is submerged in water, water pressure is applied to the cover 6. Because large portion 6b of cover 6 contacts step 10d within aperture unit 10a, cover 6 does not get forced into waterproof housing 1.

Additionally, since aperture 10a of waterproof housing 1 is smaller in size than the back side of waterproof housing 1, and since camera 101 need not be removed from waterproof housing 1 merely to change film or batteries, etc., there is less of a chance of water and other unwanted material entering the interior areas of waterproof housing 1 when film cartridge 103 needs to be loaded or unloaded.

In FIGS. 2 and 3, camera 101 allows for film cartridge loading from the bottom of a camera housing. The present invention is not so restricted when it is applied to camera assemblies, or otherwise. To the contrary, it is quite possible to configure and form waterproof housing 1 so that aperture 10a is positioned relative to the location of a corresponding sub-assembly compartment (e.g., a film cartridge compartment). For example, in the case of camera having a side or back accessible film cartridge compartment, a waterproof housing can be configured to have a corresponding aperture formed in its casing/body member. Moreover, although waterproof housing 1 is shown to have only one aperture which is associated with the film cartridge compartment 102a of camera 101, it is possible to form body 10 of waterproof housing 1 to one or more additional apertures which may be associated with other aspects of the main assembly that is to be housed in waterproof housing 1. For example, apertures (and corresponding covers for the same) may be included and provided which allow batteries and other sub-assemblies (e.g., penta-prism units for SLR type cameras, memory cards for digital imaging cameras, etc.) to be replaced within a main assembly without requiring the main assembly to be removed from a waterproof housing.

Accordingly, it should be understood that when cover 6 covers and closes aperture 10a, camera 101 will be completely housed in waterproof housing 1. When cover 6 is not mounted within aperture 10a and aperture 10a is open to reveal only that portion of camera 101 sufficient to allow loading and unloading of film cartridge 103, camera 101 is still substantially housed and encased within waterproof housing 1.

In operation, waterproof housing 1 allows camera 101 to be inserted therein to be protected from water and other materials which may otherwise damage or interfere with the operation of camera 101. After camera 101 is inserted and mounted within body 10, back 2 may be securely positioned to enclose camera 101 in a water-safe environment. If film cartridge 103 is to be inserted into or removed from camera 101 while camera 101 is housed in waterproof housing 1, cover 6 may be removed from its secure, seated position (via unscrewing the same in the case when cover 6 is threaded, removing the same when cover 6 is held in place by way of its dimensional characteristics relative to aperture 10a, etc.) to reveal access to door actuator member 105 and to cover 102 of film cartridge compartment 102a. By manually operating door actuator member 105, cover 102 will be caused to open to reveal access to film compartment 102a for film cartridge assembly insertion and removal. Because aperture 10a will allow cover 102 to open and freely move therein, there will be no compromise of motion relative to the particular design specifications of cover 102.

After film cartridge 103 has either been removed from or inserted into film compartment 102a, cover 6 may be replaced into aperture 10a and caused to be removably mounted therein. Since, cover 6 only will reveal a relatively small opening within body 10 of waterproof housing 1, there is less of a risk of water and other materials entering the interior compartment of waterproof housing 1 than if back 2 had to be removed from body 10.

Figure 4A:
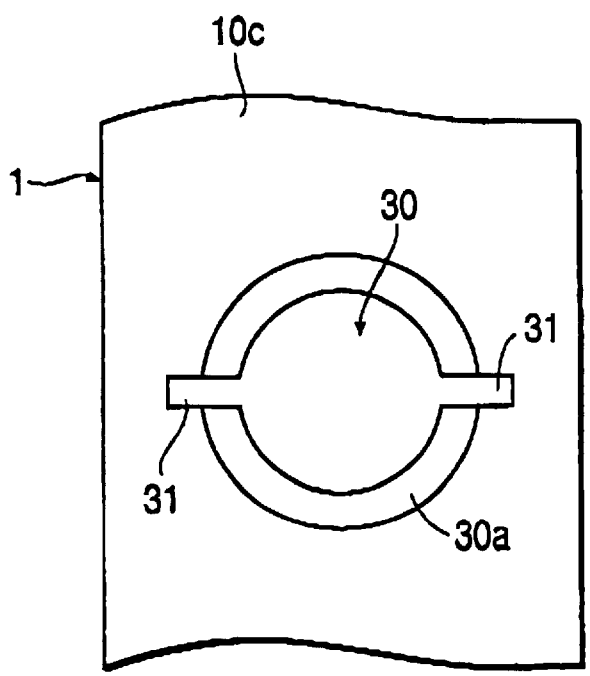
FIG. 4a is a diagram of an aperture portion of a waterproof housing and a corresponding aperture cover unit according to another preferred embodiment of the present invention.
Figure 4B:
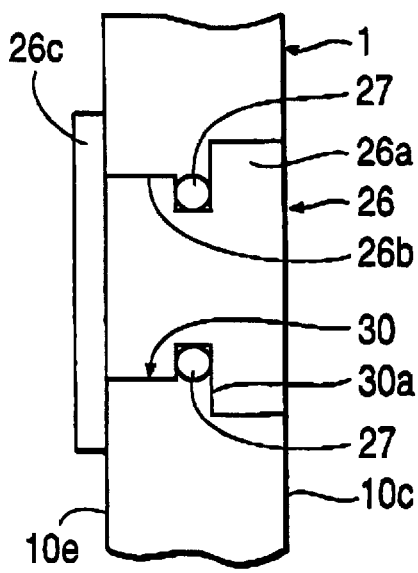
Figure 4C:
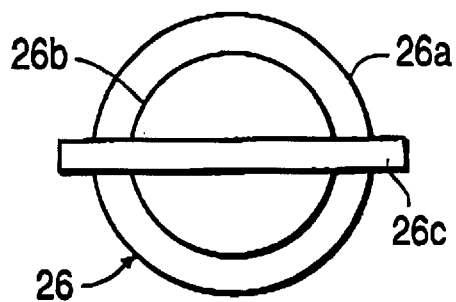

Referring now to FIGS. 4a, 4b, and 4c, depicted therein are views of an alternative embodiment of an aperture of a waterproof housing and a corresponding aperture cover unit. In particular, an aperture 30 of waterproof housing 1 is formed and disposed in a back side 10c thereof. A step or stopping shelf 30a (circularly shaped) is formed and disposed toward back side 10c in aperture 30. A pair of slots 31 are formed disposed as notches in mutually opposite positions in aperture 30. Slots 31 are formed and disposed to receive a locking member 26c of a cover 26. As shown in FIGS. 4b and 4c, cover 26 is equipped with a large circularly shaped part 26a, a small circularly shaped part 26b, and locking member 26c which Is integrally formed with small part 26b. A waterproof seal member 27 is located in an outer periphery of small circularly shaped part 26b to maintain a water tight seal when cover 26 is removably mounted in aperture 30. Cover 26 is configured to rotate within aperture 30. Locking member 26c of cover 26 is configured to facilitate manual operation thereof.

In operation, and when cover 26 is removably mounted to cover aperture 30, the locking member 26c of cover 26 is maintained in the slots 31 formed in aperture 30. Additionally, large circularly shaped part 26a of cover 26 is caused to come into contact with step 30a within aperture 30. Accordingly, when cover 26 is caused to rotate within aperture 30, locking member 26c will slide on the inner surface 10e of waterproof housing 1. As such, cover 26 closes the aperture unit 30, while locking member 26c locks and prevents cover 26 from inadvertently becoming dislodged or removed from aperture 30 such as during knocks and movement of waterproof housing 1. When turned to a state where cover 26 is locked in place by locking member 26c, waterproof seal member will provide a water tight seal and prevent water and other material from entering waterproof housing 1.

To remove cover 26 from aperture 30, a reversal of the operations just described is to be performed.

Figure 5:
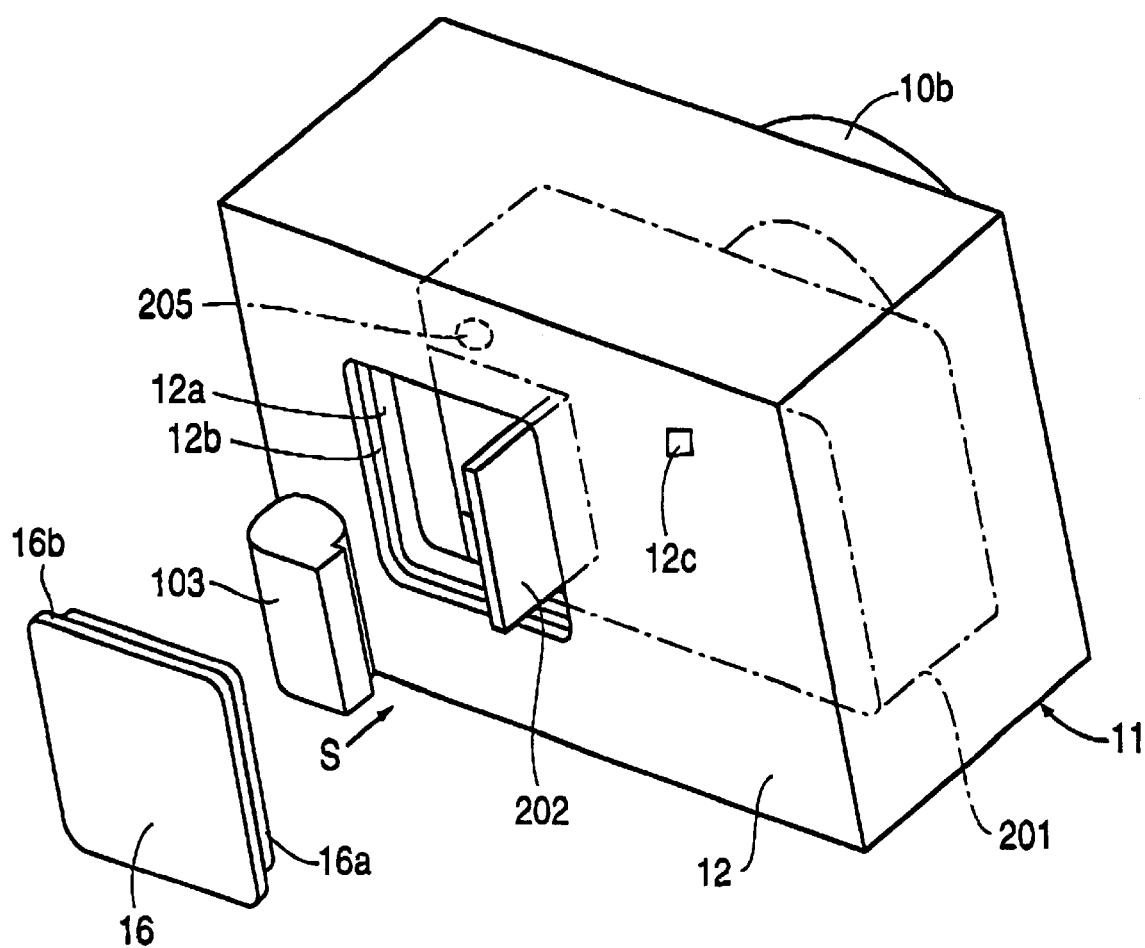
FIG. 5 is an oblique diagram of a waterproof housing for housing a device such as a camera according to another preferred embodiment of the present invention.
Figure 6:
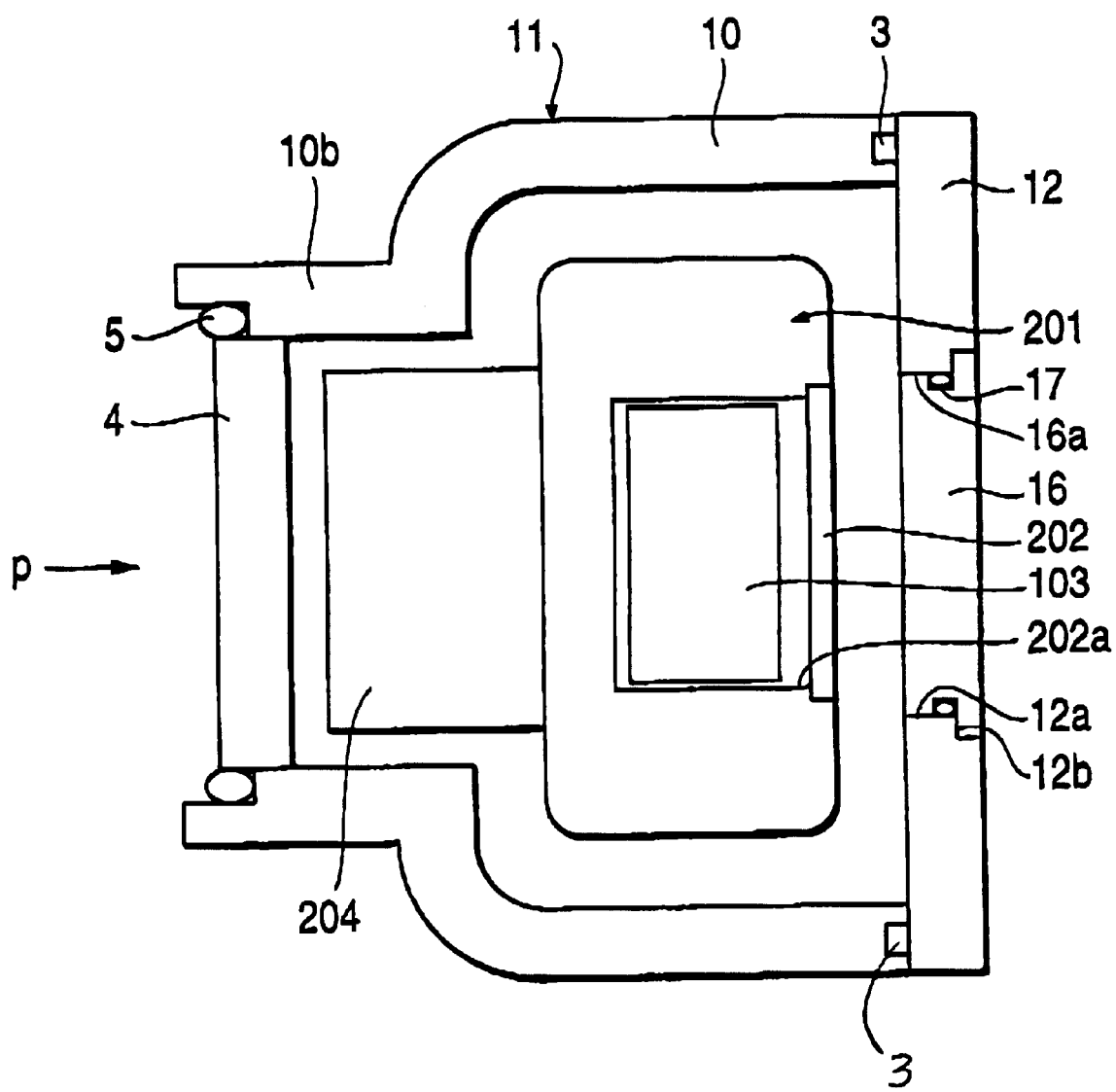
FIG. 6 is a cross section diagram of the waterproof housing illustrated in FIG. 5

Referring now to FIGS. 5 and 6, depicted therein is an oblique diagram of a waterproof housing for housing a portable assembly such as a camera according to another preferred embodiment of the present invention. As many of the structures illustrated in FIGS. 5 and 6 are the same as those illustrated in FIGS. 2–4, a discussion of the same is omitted.

Here, a housing 11, is configured with body 10 and a back 12. A watertight state is maintained as a result of the operation of a waterproof seal member 3 disposed between body 10 and back 12. A camera 201 is removably mounted in housing 1i.

Camera 201 includes a lens unit 205, and is configured to receive APS-type film cartridge 103. Film cartridge 103 is intended to be inserted into a film cartridge compartment 202a. Film cartridge compartment 202a is accessible behind a cover 202 disposed at the back of camera 201. A door opening member 205 is disposed at a position near cover 202. Door opening member is operated in a typical way by manually pressing and/or moving the same. A viewfinder window 12a of camera 201 is operatively accessible through the material which forms waterproof housing (e.g., clear plastic, acrylic, etc.). Camera 201 may be removably mounted in body 10 by well-known securing structures and techniques.

When waterproof housing 11 houses camera 201 and back 12 is securely and removably mounted on waterproof housing 11, an aperture 12a is disposed in back 12 (i.e., in the wall formed by back 12). Aperture 12a is positioned relative to cover 202 of camera 201. Aperture 12a is constituted in a rectangular form, and is of a size that will facilitate loading and unloading of film cartridge 103 into and out of film cartridge compartment 202a of camera 201 as if camera 201 were not encased within waterproof housing 11 and without interfering with the normal operation of cover 202. Accordingly, aperture 12a will allow film cartridge 103 to be inserted in to film cartridge compartment 202a by operation in a normal direction relative to camera 201 and in the direction identified by the arrow labeled "S".

In aperture 12a, a step or stopping shelf 12b is formed toward the surface of back 12. A cover 16, is formed and configured to fit into aperture 12a to close aperture 12a. Cover 16 has a cross sectional form which corresponds to the cross sectional form of aperture 12a including a corresponding formation to accommodate or be stopped from slipping into waterproof housing 11 by step 12b. A waterproof seal member 17 is located in the exterior periphery of an inner portion 16a of cover 16 to maintain the watertight state of the waterproof housing 11.

In operation, film cartridge 103 is inserted into camera 201 by first removing cover 16 from back 12 of body 10 to reveal aperture 12a. Thereafter, door operating member 205 may be manually operated to open cover 202 to gain access to film cartridge compartment 202a. Film cartridge 103 may be removed from camera 201 in similar fashion. Accordingly, like the embodiment illustrated in FIGS. 2 and 3, it is not necessary to remove camera 201 from waterproof housing 11 to gain access to a removable sub-assembly such as a film cartridge, etc.

In the embodiments described above, waterproof housing 1 has a box-like shape. Such a shape has been arranged to match the shape of the exemplary portable assemblies and devices (e.g., cameras) that have been used to illustrate the features of the present invention. The present invention, however, is not so limited. In fact, a waterproof housing according to the present invention may take on any shape that suits particular design requirements such as spheres, etc. In all cases, a waterproof housing according to the present invention may now have a wall (e.g., a flat wall in the case of a box-like shaped housing, a spherical or rounded wall in the case of a spherically shaped housing, etc.) that has an aperture formed therein which will provide operative access to a housed assembly for insertion, removal or otherwise reception of a sub-assembly and which has dimensions that relate to the corresponding dimensions of the sub-assembly.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A waterproof housing adapted to removably receive a camera having film cartridge compartment and a film cartridge compartment cover, comprising:

a body having at least two apertures, one aperture being a first aperture which allows the camera to be inserted and removed, and another aperture being a second aperture providing operative access to said film cartridge compartment of said cameras said first aperture being disposed in a first surface of said body, said second aperture being disposed in a second surface of said body, said first surface being substantially perpendicular to said second surface; and at least two cover members for closing each of said at least two apertures and for preventing water from passing through each of said at least two apertures.

2. The waterproof housing according to claim 1, wherein said second aperture is disposed in a bottom wall of said waterproof housing.

3. The waterproof housing according to claim 1, wherein said second aperture is disposed in a side wall of said waterproof housing.

4. The waterproof housing according to claim 1, wherein said second aperture has dimensions that are substantially the same as corresponding dimensions of said film cartridge compartment.

5. The waterproof housing according to claim 1, wherein said film cartridge compartment of said camera is configured to receive a film cartridge having a particular width dimension, said second aperture having a dimension corresponding to said width dimension of said film cartridge.

6. The waterproof housing according to claim 1, wherein said second aperture has dimensions corresponding to dimensions of said film cartridge compartment cover.

7. The waterproof housing according to claim 1, wherein said cover members further comprise seal members for sealing said waterproof housing when said cover members cover said first and second apertures.

8. The waterproof housing according to claim 1, wherein said cover members further comprise locking members for locking said cover members to said waterproof housing when said cover members cover said first and second apertures, said first and second apertures being configured to permit said locking members to be inserted into said waterproof housing.

9. A waterproof housing adapted to removably receive an imaging device configured to receive a sub-assembly related to the operation of said imaging device, said waterproof housing comprising:

a body having a first aperture allowing said imaging device to be removably inserted into said body, and a second aperture providing operative access to a portion of said imaging device configured to receive said sub-assembly related to the operation of said imaging device, said first aperture being disposed in a first surface of said body, said second aperture being disposed in a second surface of said body, said first surface being substantially perpendicular to said second surface; and two cover members corresponding to said first and second apertures for covering said first and second apertures and for preventing water from passing through said first and second apertures.

10. The waterproof housing according to claim 9, wherein said second aperture is disposed in a rear wall of said waterproof housing.

11. The waterproof housing according to claim 9, wherein said second aperture is disposed in a bottom wall of said waterproof housing.

12. The waterproof housing according to claim 9, wherein said second aperture is disposed in a side wall of said waterproof housing.

13. The waterproof housing according to claim 9, wherein said second aperture has dimensions that are substantially the same as corresponding dimensions of said portion of said imaging device that is configured to receive said sub-assembly related to the operation of said imaging device.

14. The waterproof housing according to claim 9, wherein said imaging device is a digital camera and said portion of said imaging device is a data storage module compartment, said second aperture providing operative access to said data storage module compartment.

15. The waterproof housing according to claim 9, wherein said portion of said imaging device is a battery compartment, said second aperture providing operative access to said battery compartment.

16. The waterproof housing according to claim 9, wherein said cover members further comprise seal members for sealing said waterproof housing when said cover members cover said first and second apertures.

17. The waterproof housing according to claim 9, wherein said cover members further comprise locking members for locking said cover members to said waterproof housing when said cover members cover said first and second apertures, said first and second apertures being configured to permit said locking members to be inserted into said waterproof housing.

18. The waterproof housing according to claim 9, wherein said second aperture is smaller than said first aperture and said sub-assembly is an image data recording medium.

19. The waterproof housing according to claim 9, wherein said second aperture is smaller than said first aperture and said sub-assembly is a battery.

20. A waterproof housing adapted to removably receive a device adapted to receive a sub-assembly, said waterproof housing comprising:

a body having a first aperture allowing said device to be removably inserted into said body, and a second aperture providing operative access to a portion of said device configured to receive said sub-assembly related to the operation of said device, said first aperture being disposed in a first surface of said body, said second aperture being disposed in a second surface of said body, said first surface being substantially perpendicular to said second surface; and two cover members corresponding to said first and second apertures for covering said first and second apertures and for preventing water from passing through said first and second apertures.

21. The waterproof housing according to claim 20, wherein said cover members further comprise seal members for sealing said waterproof housing when said cover members cover said first and second apertures.

22. The waterproof housing according to claim 20, wherein said cover members further comprise locking members for locking said cover members to said waterproof housing when said cover members cover said first and second apertures, said first and second apertures being configured to permit said locking members to be inserted into said waterproof housing.

* * * * *